US008783286B2

(12) United States Patent
Suryo et al.

(10) Patent No.: US 8,783,286 B2
(45) Date of Patent: Jul. 22, 2014

(54) PIPING INTERNALS TO CONTROL GAS-LIQUID FLOW SPLIT

(75) Inventors: Ronald Suryo, Fairfax, VA (US); Anastasios Skoulidas, Bristow, VA (US); David L. Vannauker, Kingwood, TX (US)

(73) Assignee: Exxonmobil Research and Engineering Company, Annandale, NJ (US)

( * ) Notice: Subject to any disclaimer, the term of this patent is extended or adjusted under 35 U.S.C. 154(b) by 232 days.

(21) Appl. No.: 13/325,194

(22) Filed: Dec. 14, 2011

(65) Prior Publication Data

US 2012/0152363 A1 Jun. 21, 2012

Related U.S. Application Data

(60) Provisional application No. 61/423,734, filed on Dec. 16, 2010.

(51) Int. Cl.
*F16L 41/00* (2006.01)

(52) U.S. Cl.
USPC ..................... 137/561 A; 137/601.18; 138/42

(58) Field of Classification Search
USPC ............... 137/561 R, 599.01, 601.18, 561 A; 138/37, 42
See application file for complete search history.

(56) References Cited

U.S. PATENT DOCUMENTS 3,460,580 A 8/1969 Carter
4,544,207 A 10/1985 Litz
4,574,837 A * 3/1986 Aggour et al. ............ 137/561 A
4,715,395 A * 12/1987 Mainelli et al. ................. 138/42
4,824,614 A 4/1989 Jones
4,960,260 A * 10/1990 McEnearney ................. 251/127
5,407,274 A 4/1995 Woerheide et al.
5,670,093 A 9/1997 Payne
5,709,468 A 1/1998 Woerheide et al.
5,810,032 A * 9/1998 Hong et al. ............... 137/561 A
6,056,001 A 5/2000 Boyles et al.

(Continued)

FOREIGN PATENT DOCUMENTS

DE WO2005113157 12/2005
NO WO2007055590 5/2007
WO WO2009137457 11/2009
WO WO2009157925 12/2009

OTHER PUBLICATIONS

K.C. Hong, et al., "Two-phase flow splitting at an impacting tee," SPE Production & Facilities (1995), vol. 10, No. 3, pp. 184-190.

(Continued)

*Primary Examiner* — John Rivell
*Assistant Examiner* — Angelisa Hicks
(74) *Attorney, Agent, or Firm* — Bruce M. Bordelon; Chad A. Guice

(57) ABSTRACT

Structures and methods are provided for improving the distribution of fluids between exit flows from a split junction, such as a tee-junction. The improved distribution of fluids can result in a more equal distribution of both gases and liquids between the exits of the junction. The improvement can be provided by using a baffle structure, such as an annular baffle structure, upstream from the desired junction. The baffle structures can improve the distribution of fluids in the exit flows in various manners, such as by reducing the amount of vorticity or "swirl" in the input flow to the junction or by reducing the separation of gases from liquids within a flow.

14 Claims, 4 Drawing Sheets

(56) References Cited

U.S. PATENT DOCUMENTS

| | | | | |
|---|---|---|---|---|
| 7,225,829 | B2 * | 6/2007 | Bailey | 137/454.6 |
| 2009/0095487 | A1 * | 4/2009 | Xu et al. | 166/373 |
| 2009/0159528 | A1 | 6/2009 | Bjerkreim et al. | |

OTHER PUBLICATIONS

E. Wren, et al., "Affecting the phase split at a large diameter T-junction by using baffles," Experimental Thermal and Fluid Science (2004), vol. .28, No. 8, pp. 835-841.

K.C. Hong, et al., "Two-phase flow splitting at an impacting tee," Cost Effective Operations and Technology. SPE 64th Annual Western Regional Meeting (1994), pp. 179-194.

Edward K. Levy, et al., "Control of solids flow distribution at a splitter junction in a two-phase turbulent flow," AIChE Spring National Meeting, Conference Proceedings, Orlando, FL, (2006) p. 36091/1-36081/6.

* cited by examiner

PIPING INTERNALS TO CONTROL GAS-LIQUID FLOW SPLIT

CROSS REFERENCE TO RELATED APPLICATION

This Non-Provisional Application claims the benefit of U.S.Provisional Application No. 61/423,734 filed Dec. 16, 2010.

FIELD OF THE INVENTION

The invention is generally related to handling of fluid flows in a reaction system, such as fluid flow in a refinery setting.

BACKGROUND OF THE INVENTION

Large reaction systems can have multiple locations where a fluid flow in a pipe is split into two separate streams. In many situations, it can be desirable to split such a fluid flow so that the resulting separate streams contain roughly equal portions of the initial flow. Unfortunately, simply forming a tee-junction of pipes does not automatically result in a roughly equal distribution. This problem is accentuated for fluid flows that include both a gas phase and a liquid phase portion.

U.S. Pat. No. 4,824,614 describes an internal pipe structure for improving the division of fluid flow between two branches of a pipe. The piping internals can include a static mixer which is followed by a flow stratifier and a flow divider. The resulting combination of serial structures is designed for use in splitting a flow in a side junction situation, where one portion of the flow continues in roughly the same direction as the flow prior to splitting.

U.S. Pat. No. 5,670,093 describes a structure for splitting fluid flows that avoids the use of a tee-junction. The structure appears to be designed for use in vertical pipes, where gravity aids the flow of fluid along the vertical direction. After flowing through a static mixer, the fluid enters a plurality of pipes that have a roughly parallel flow path compared in the initial pipe.

U.S. Pat. No. 5,810,032 describes a variety of possible internal structures for use near a tee-junction. Structures are described that include a dividing wall placed in the pipe upstream from the tee-junction. Nozzle structures are used on the two exit pipes from the tee-junction to constrict the flow. The nozzles on the exit pipes are described as causing turbulence that improves mixing of the liquid and gas prior to flowing into the exit pipes. U.S. Pat. No. 5,810,032 also describes an embodiment where the pipe for the input to the tee-junction is narrowed prior to entering the junction. However, this configuration is reported as actually increasing the disparity between the exit flows from the tee-junction.

U.S. Patent Application Publication No. 2009/0159528 describes a flow divider system where a dividing fin is placed in a pipe prior to a junction.

PCT Publication No. WO 2009/157925 A1 describes a flow splitting device for annular two phase pipe flow. The flow splitting device appears to be designed for use in a side junction situation, where one of the exit flows continues along roughly the same direction as the input flow to the junction. The flow splitting device includes an annular ring that constricts the input flow prior to entering the side junction. If the flow in the pipe has the form of a liquid near the pipe walls with a central core of gas, the annular ring forces the liquid away from the walls. All of the gas and liquid in the flow pass through the central opening of the annular ring. Downstream from the annular ring, a flow barrier is also included that partially obstructs the flow into the exit pipe that is roughly aligned with the input pipe.

SUMMARY OF THE INVENTION

In one aspect of the invention, a baffle structure for a conduit carrying a fluid flow including a gas phase component and a liquid phase component is provided. The baffle structure can include a structure that defines a central opening. A ring can surround the structure defining the central opening, an inner surface of the ring being in contact with the structure defining the central opening. The ring can include a plurality of slots, each slot having a slot entrance. At least one barrier plate can be located a distance above an entrance for each of the plurality of slots, the at least one barrier plate providing a total barrier plate surface area greater than a combined area of the slot entrances. The baffle structure can also include at least one drainage hole, the drainage hole having an area less than an area of a slot entrance.

In another aspect of the invention, a baffle structure for a conduit carrying a fluid flow including a gas phase component and a liquid phase component is provided. The baffle structure can include a structure that defines a central opening. A plurality of rings can surround the structure defining the central opening, an inner surface of at least one of the plurality of rings being in contact with the structure defining the central opening. Each of the rings can include at least one slot, the slots being aligned to create a pass-through opening along an axis parallel to an axis of the central opening.

In still another aspect of the invention, a method for improving the distribution of a fluid flow between outlet conduits of a conduit junction is provided. The method includes introducing a fluid flow including both a gas phase component and a liquid phase component into an inlet conduit of a conduit junction, the conduit junction having at least two outlet conduits. A baffle structure can be provided in the inlet conduit. The baffle structure can include: a structure that defines a central opening; a ring surrounding the structure defining the central opening, an inner surface of the ring being in contact with the structure defining the central opening; a plurality of slots in the ring, each slot having a slot entrance; at least one barrier plate located a distance above an entrance for each of the plurality of slots, the at least one barrier plate providing a total barrier plate surface area greater than a combined area of the slot entrances; and at least one drainage hole, the drainage hole have an area less than an area of a slot entrance. An exit from a central opening of the baffle structure can be less than about 2.0 times the length of the baffle structure from the conduit junction. The fluid flow can be passed through the baffle structure, at least a portion of the gas phase component passing through the central opening of the baffle structure and at least a portion of the liquid phase component passing through the plurality of slots in the ring. The fluid flow can then be divided between the at least two outlet conduits. A volume of the gas phase component received by each outlet conduit can differ by about 15 percent or less. Additionally or alternately, a volume of the liquid phase component received by each outlet conduit can differ by about 15 percent or less. A volume of the gas phase component and/or the liquid phase component received by each outlet conduit can differ by more than about 20 percent in the absence of the baffle structure.

DETAILED DESCRIPTION OF THE EMBODIMENTS

Overview

Figure 1:
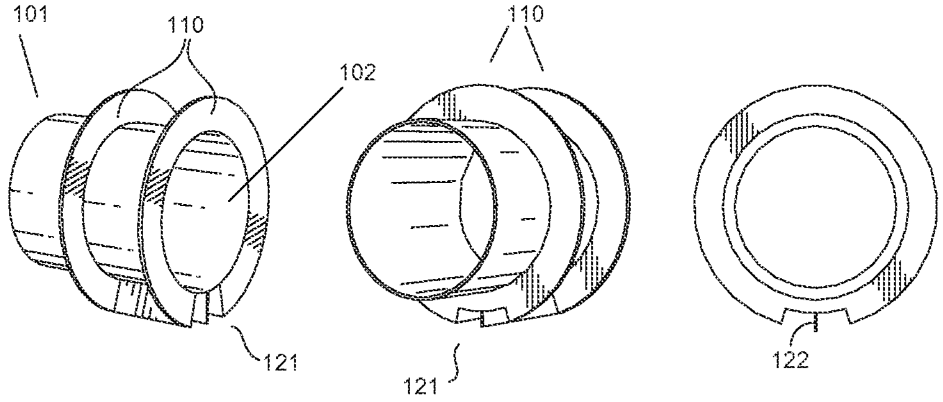
FIG. 1 schematically shows an example of a baffle suitable for use as a horizontal baffle according to an embodiment of the invention.

Achieving a roughly equal division of an input flow between two output flows at a tee-junction can be valuable in a variety of situations. For example, in order to perform heat exchange in a refinery setting, it can be desirable to divide a flow between multiple fin-fan exchangers. With a conventional tee-junction, the exit flows from the junction can differ substantially in certain situations. Uneven distribution of liquid and gas in the exit flows can result in increased corrosion, e.g., by the portion of the flow that receives the greater portion of the gas flow and the lesser portion of the liquid flow. This can result in failure of a component at an earlier time than expected and therefore increased amounts of unplanned down time. A system for creating a more equal division of flows from a junction can mitigate this problem. Such a system for creating a more equal division of flows can be useful in a variety of processes. These processes can include industrial processes where the combination of pressure and flow velocity within a piping network result in annular fluid flows, stratified fluid flows, and/or other types of fluid flows involving a separation of gas and liquid.

In various embodiments, structures and methods are provided for improving the distribution of fluids between exit flows from a split junction. The fluids can include both a gas phase component and a liquid phase component. The improved distribution of fluids can result in a more equal distribution of both gases and liquids between the exits of the junction. The improvement can be provided by using a baffle structure, such as an annular baffle structure, upstream from the desired junction. Baffle structures can be used for either a horizontally or vertically oriented junction. In some embodiments, the baffle structures can improve the distribution of fluids in the exit flows by reducing the amount of vorticity or "swirl" in the input flow to the junction.

One potential use for annular baffles according to the invention is within a processing train for processing of hydrocarbons, such as is hydroprocessing of petroleum fractions or biomass derived hydrocarbons. Hydroprocessing can generally refer to hydrotreatment, hydrocracking, catalytic dewaxing, hydrofinishing, and other processes involving treating a hydrocarbon fraction with hydrogen in the presence of a catalyst. Other refinery processes can involve treatment of a hydrocarbon fraction without the presence of hydrogen and/or without the presence of a catalyst. The various types of hydrocarbon flows within a refinery, whether describing a liquid component, a gas component, or a flow with both a liquid and gas component, can be referred to as refinery process flows.

Definitions

In the discussion herein, baffles can be described as being located upstream from a junction of pipes or other conduits. In the discussion below, a vertical junction refers to a junction where the inlet pipe is less than 45° from a vertical axis, where the vertical axis is defined relative to the expected direction of gravity. A horizontal junction refers to a junction where the inlet pipe is more than 45° from such a vertical axis. A substantially vertical junction refers to a junction where the inlet pipe is less than about 5° from the vertical axis, while a substantially horizontal junction refers to a junction where the inlet pipe is greater than about 85° from the vertical axis.

In various embodiments, baffles can be used for improving flow distribution at a junction. The conduits into and out of a junction can have any convenient size. The inlet conduit to a junction can have the same diameter as the outlet conduits, or one or more of the outlet conduits can have a different diameter. In the discussion herein, a "tee-junction" refers to a junction where the angle between the inlet conduit and each outlet conduit is greater than about 45°, and where the outlet conduits from the junction are approximately aligned along an axis. A "substantially perpendicular junction" refers to a junction where the angle between the inlet conduit and each outlet conduit is at least about 85°. A "perpendicular junction" refers to a junction where the angle between the inlet conduit and each outlet conduit is about 90°. Note that in some embodiments, a junction may include outlet conduits that are not aligned along the same axis. For example, a vertical junction could have two or more outlet conduits oriented at any convenient angle relative to each other in the horizontal plane. Junctions where all outlet conduits are not aligned along an axis are referred to herein as split junctions. For clarity in the discussion herein, baffles according to embodiments of the invention are described for use relative to various types of tee-junctions. However, it should be understood that the baffles can additionally or alternately be used with other types of split junctions.

In the discussion herein, the term "cylinder" has the modern mathematical definition of the term. The term cylinder should not be limited strictly to the special case of a cylinder with a circular cross-section. Instead, a cylinder can refer to any shape defined by translating a closed, continuous two-dimensional cross-section along an axis in a parallel manner. Thus, in addition using a circular cross-section to form a circular cylinder, other cross-sectional shapes can be used, such as parallelepipeds, trapezoids, hexagons, triangles, and/or other regular or irregular shapes with an arbitrary number of sides and/or curved portions.

General Annular Baffle Structure

Many conduits within a fluid transport network, such as a refinery network, may contain a flow that includes both gas phase and liquid phase components. As the flow passes through the network, the gas phase and liquid phase portions of the flow may not be well mixed within the pipe. For example, for a slow, non-turbulent flow through a substantially horizontal conduit, the gas and liquid portions may separate and/or disassociate based on gravity to form an upper gas portion and a lower liquid portion. More generally, the combination of pressure and flow rate within a conduit can determine the relative flow patterns of gas and liquid within the conduit.

A situation that can arise in a variety of processes, such as processes related to a refinery, can include a flow within a conduit where the flow develops some degree of vorticity or swirl. A large reaction system network, such as a refinery network, can have many types of conduit structures within the piping network. These can include various bends or elevation changes in the piping network. Some or all of the features of the piping network can introduce vorticity/swirl into the flow. This swirl can compound difficulties, e.g., due to an annular (or other stratified) flow pattern within a pipe or conduit. In an annular flow pattern, the higher density liquid can typically occupy the exterior portion of a flow, while the gas can primarily occupy the center of the flow in the conduit. Without being bound by any particular theory, it is believed that vorticity/swirl within a fluid flow into a tee-junction can be a contributing factor to poor distribution of fluids into the exit flows from the tee-junction.

Thus, in an embodiment, an annular baffle can be used to reduce and/or mitigate the vorticity/swirl within an input flow to a junction and/or to reduce and/or mitigate stratification within a flow pattern. The general shape of the annular baffle can include one or more of several features. One feature of an annular baffle can be a central opening. In an embodiment, the central opening can be defined by an open cylindrical structure, such as a circular cylinder. The central opening can allow gas from the interior of a flow to pass through the baffle, e.g., without substantial diversion of the gas. Depending on the diameter of the central opening and/or the amount of fluid in the conduit, a portion of the liquid can also flow through the central opening.

The diameter of the central opening can be selected to provide a desired cross sectional area relative to the cross sectional area of the conduit containing the baffle. In an embodiment, the cross sectional area of the central opening can be at least about 25% of the cross sectional area of the conduit, for example at least about 30%, at least about 40%, or at least about 50%. Additionally or alternately, the cross sectional area of the central opening can be about 70% or less of the cross sectional area of the conduit, for example about 60% or less or about 50% or less. In some embodiments, the central axis of the central opening can be approximately aligned with the central axis of the conduit containing the baffle.

Additionally or alternately, the diameter of the central opening can change over the length of the central opening, e.g., due to (differential) expansion and/or contraction. For any features specified relative to the cross-sectional area of the central opening, the cross-sectional area of the narrowest portion of the central opening should be used.

The structure defining the central opening can be surrounded by one or more rings to form a baffle structure. For example, the one or more rings can have an inner diameter that corresponds to the cylinder (or other structure) that defines the central opening cross-section and an outer diameter that optionally can correspond to the cross-section of the interior of the conduit. Depending on the type of baffle, the rings can include various openings that can allow fluid to pass through the rings. The surrounding rings can prevent a swirling liquid from reaching a subsequent split junction while still maintaining strong vorticity. Instead, the flow of a swirling liquid can be diverted by the one or more rings, e.g., so that the flow passes through one of the openings in the rings, which can reduce the swirl present in the flow.

In the discussion herein, the outer diameter of the one or more rings surrounding the central opening can be used to define a cross-sectional area for the baffle. This can allow, for example, a comparison of the cross-sectional area of the baffle with the cross-sectional area of the central opening. A diameter for the baffle can be similarly defined based on the diameter of the one or more rings, at least for those embodiments involving a baffle with an approximately circular cross-section. Thus, if it is desirable to make a comparison between a feature of the baffle and the diameter of the conduit for use with the baffle, such a comparison can equally be made with the diameter of the baffle. In an embodiment where a baffle with multiple rings is designed for use at a location in a conduit where the conduit changes cross-section between the multiple rings, the diameter and cross-section of the largest ring can be used to define the diameter and cross-section of the baffle.

The annular baffle can be placed in reaction system network in the conduit corresponding to the input flow to a split junction, such as a tee-junction. Relative to the flow of fluid within a piping network, the annular baffle can be located upstream from the split junction or tee-junction. Optionally, one or more of the outlet conduits from the split junction can have an interior that does not contain any flow modification devices such as baffles, nozzles, static mixers, or other internal pipe structures designed and/or intended to modify flow characteristics. Additionally or alternately, all outlet conduits from a split junction can have an interior that does not contain any flow modification devices. The openings within the rings of the baffle can vary depending on Whether the baffle is used in a conduit with a vertical or horizontal orientation. In various embodiments, the presence of the baffle can improve the distribution of gas and/or liquid between the exit flows from a junction.

In general, conduit configurations in which a volumetric proportion of mixed liquid phase and gas phase feed pass from an inlet conduit through a conduit junction into two or more outlet conduits can occasionally have issues where the volumetric proportion of liquid phase and/or gas phase in at least one of the outlet conduits varies significantly from the volumetric proportion of that(those) same phase(s) from the inlet and/or in at least one other outlet conduit. This can occur whether a baffle according to the invention is present or not. However, the presence of a baffle in the inlet conduit should result in a reduction of the variation between the volumetric proportions of liquid phase and/or gas phase between the inlet conduit and at least one outlet conduit and/or between at least two of the outlet conduits.

In a conduit configuration that does not include a baffle structure according to the invention, the volume of gas phase component and/or liquid phase component received by each outlet conduit of a conduit junction can vary. The volume of gas phase component received by each outlet conduit of the conduit junction can differ by more than about 20%, for example more than about 25%, more than about 30%, or more than about 35%. Additionally or alternately, the volume of liquid phase component received by each outlet conduit of the conduit junction can differ by more than about 20%, for example more than about 25%, more than about 30%, or more than about 35%. Inserting a baffle structure according to the invention upstream from the conduit junction can thus improve the distribution of fluid flow into the outlet conduits by rendering the fluid split amongst the outlet conduits more uniform (e.g., closer to the liquid/gas proportion from the inlet conduit). In an embodiment using a baffle structure, the volume of the gas phase component received by each outlet conduit can differ by about 15% or less and/or the volume of the liquid phase component received by each outlet conduit can differ by about 15% or less. Additionally or alternately, the volume of the gas phase component received by each of the outlet conduits can differ by about 15% or less, for example about 12% or less, about 10% or less, or about 8% or less. Further additionally or alternately, the volume of the liquid phase component received by each of the outlet conduits can differ by about 15% or less, for example about 12% or less, about 10% or less, or about 8% or less.

Horizontal Baffle Configuration

In various embodiments, a horizontal baffle configuration refers to a baffle located in a conduit with a horizontal or substantially horizontal orientation. A tee-junction for splitting the flows from a horizontal conduit could have exit flows arranged roughly in the plane of the horizontal axis. Alternately, the exit flows could be arranged to have at least a partially vertical orientation. Although the horizontal baffle should work with any orientation of split junction, it is noted that a split junction resulting in exit flows with a vertical component may suffer from additional differences in the exit flows due to gravitational effects.

As described herein, the basic structure for a horizontal annular baffle includes a central opening. A horizontal annular baffle can also include one or more rings surrounding the central opening somewhere along the length of the baffle. In some embodiments, a horizontal annular baffle can include at least two rings. The rings can be located at any convenient location along the length of the baffle. In an embodiment, one of the rings can be located roughly at the exit for the central opening. For a central opening that has the shape of a circular cylinder, this can correspond to having the ring located roughly in the plane of the exit for the central opening.

In an embodiment involving two or more rings, the rings can be separated by a distance that is characterized relative to the length of the baffle. In such an embodiment, the distance between the rings can be at least about 10% of the length of the baffle, for example at least about 20% or at least about 30%. Additionally or alternately, the distance between rings can be about 50% or less of the length of the baffle, for example about 40% or less or about 30% or less.

In many embodiments, the length of the baffle can correspond to the length of the cylinder (or other structure) that forms the central opening. One way to define the length of the baffle can be relative to the diameter of the pipe or other conduit containing the baffle. In such a situation, the length of the baffle can be at least about 0.5 times the diameter of the conduit, for example at least about 0.75 times, at least about 1.0 time, at least about 1.25 times, or at least about 1.5 times. Additionally or alternately, the length of the baffle can be about 2.5 times the diameter of the conduit or less, for example about 2.0 times less, about 1.75 times or less, or about 1.5 times or less. Note that, as described above, references to the diameter of the conduit can equally be viewed as references to the diameter of the baffle based on the outer diameter of the rings of the baffle.

Based on the location of the ring(s), one or more volumes can be formed between the cylinder (or other shape) that defines the central opening and the conduit containing the baffle. During operation, liquid from a fluid flow can accumulate in this volume. As described herein, liquid in this volume can pass through the baffle via one or more openings in the ring(s).

For a horizontal baffle, at least one slot opening can be included in the one or more rings. In an embodiment where only one slot opening is included in the rings, the slot opening can be located at the bottom of the ring(s). The slot opening(s) can allow fluid in the volume around the central opening to pass through the baffle. If desired, slot openings in different rings can have different sizes. In embodiments where the slot is formed at the bottom of the ring, gravitational forces can reduce or prevent stagnation of fluid in the volume around the central opening.

When two or more rings are present, the slot openings can be approximately aligned. This can allow one or more straightening vanes to be included in the baffle. A straightening vane can be a wall structure that runs along the length of the distance between slot openings in the rings. In one embodiment, a straightening vane can be the only wall structure located between the rings. Alternately, one or more additional wall structures can be included so that the distance between the rings corresponds to a substantially closed passage.

Within a conduit, a horizontal annular baffle can be located in the conduit based on a proximity to a downstream junction. In an embodiment, the location of the baffle can be defined relative to the location of the exit from the central opening. The location can additionally or alternately be defined based on using the length of the baffle structure as a characteristic distance. Based on this, the exit from the central opening for a horizontal annular baffle can, in one embodiment, be no more than about 0.5 times the length of the baffle structure from the entrance to a junction, for example no more than about 1.0 times the length, no more than about 1.5 times the length, or no more than about 2.0 times the length. Additionally or alternately, the exit from the central opening can be at least about 0.1 times the length of the baffle structure from the entrance to the junction, for example at least about 0.25 times the length, at least about 0.5 times the length, or at least about 1.0 times the length.

FIG. 1 shows an example of several views of a horizontal baffle according to an embodiment of the invention. In FIG. 1, a circular cylinder structure 101 defines a central opening 102. In the embodiment shown in FIG. 1, two rings 110 surround the circular cylinder structure 101. The rings can include an opening 121, with a straightening vane 122 located inside of the opening.

Figure 2:
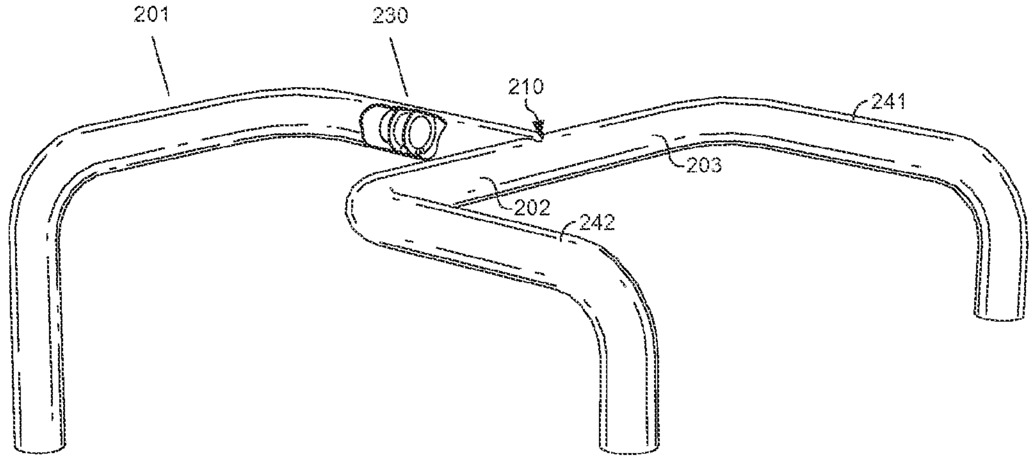
FIG. 2 schematically shows an example of a piping network that includes a horizontal junction.

FIG. 2 shows an example of a piping network suitable for use with a horizontal baffle according to an embodiment of the invention. In FIG. 2, a fluid flow approaches a horizontal tee-junction 210 via an inlet pipe 201. A horizontal baffle 230 is located in inlet pipe 201 prior to the tee-junction 210. After passing through the horizontal baffle 230, fluid can enter tee-junction 210 and can be split into outlet pipes 202 and 203. In the example shown in FIG. 2, outlet pipes 202 and 203 serve as input to refinery process elements, such as fin-fan heat exchangers. Locations 241 and 242 are examples of possible locations for such refinery process elements. The use of the horizontal baffle 230 can result in a more equal distribution of the gas phase portion and/or the liquid phase portion of the input fluid flow to the refinery process elements at locations 241 and 242.

Vertical Baffle Configuration

In various embodiments, a vertical baffle configuration refers to a baffle located in a conduit with a vertical or substantially vertical orientation. A tee-junction for splitting the flows from a vertical conduit could have exit flows arranged roughly in the plane of the horizontal axis. Alternately, the exit flows could be arranged to have at least a partially vertical orientation. Although the vertical baffle should work with any orientation of split junction, it is noted that a split junction resulting in exit flows with a vertical component may suffer from additional differences in the exit flows due to gravitational effects.

As described herein, the basic structure for a vertical annular baffle includes a central opening. In an embodiment, the vertical annular baffle can also include a ring surrounding the central opening somewhere along the length of the baffle. In some cases, the ring can be located roughly at the exit for the central opening. For a central opening that has the shape of a right circular cylinder, this can correspond to having the ring located roughly in the plane of the exit for the central opening. Alternately, the ring can be located at a distance away from the exit for the central opening. In various embodiments, the distance of the ring from the exit for the central opening can be 50% or less of the length of the baffle, for example 40% or less, 30% or less, 20% or less, or 10% or less. Additionally or alternately, in embodiments where the ring is located at a distance away from the exit for the central opening, the distance from the exit can be at least 5% of the length of the baffle, for example at least 10% of the length or at least 20% of the length.

The length of the baffle can correspond to the length of the cylinder (or other structure) that forms the central opening. In an embodiment, the length of the baffle can be defined relative to the diameter of the pipe or other conduit containing the baffle. In such an embodiment, the length of the baffle can be at least about 0.5 times the diameter of the conduit, for example at least about 0.75 times, at least about 1.0 time, at least about 1.25 times, or at least about 1.5 times. Additionally or alternately in such an embodiment, the length of the baffle can be about 2.5 times the diameter of the conduit or less, for example about 2.0 times or less, about 1.75 times or less, or about 1.5 times or less. Note that as described above, references to the diameter of the conduit can equally be viewed as references to the diameter of the baffle based on the outer diameter of the ring(s) of the baffle.

Based on the location of the ring(s), a volume can be formed between the circular cylinder (or other shape) that defines the central opening and the conduit containing the baffle. During operation, liquid from a fluid flow can accumulate in this volume. As described herein, liquid in this volume can pass through the baffle via one or more openings in the ring(s).

For a vertical baffle, two kinds of openings can be included in a ring surrounding the cylinder defining the central opening. One type of opening can be a slot baffle. The slot baffle can be a slot shaped opening in the ring. The slot can have any convenient shape. For example, the slot can have a linear shape, a radial shape that matches the curvature of the ring, or another convenient shape. In an embodiment, one or more slot baffles can be included in the ring. The slot baffle(s) can be symmetrically placed around the ring(s), based on the number of slot baffles.

In an embodiment, the slot for a slot baffle can be defined by an opening in the ring(s). Alternately, the slot can be a cylinder having the shape of the slot. The height of the cylinder can be a height that is less than the distance from the ring to the front of the baffle (i.e., the entrance of the central opening). In various embodiments, the slot baffle cylinder can have a height that is less than about half of the distance between the ring and the front of the baffle, for example a height that is less than about a third of the distance. Optionally, a slot baffle cylinder can include a straightening vane inside the cylinder.

In some embodiments, the slot baffle can include a blocking or hat structure. When present, the slot baffle blocking structure can be at least the size of the slot and can be positioned to prevent direct flow of fluid through the slot baffle. The blocking structure for the slot baffle can have any convenient shape, so long as the shape of the slot baffle can fit within the shape of the blocking structure. In an embodiment, the blocking structure can have the same shape as the slot baffle. Optionally, the blocking structure can have an enlarged version of the shape of the slot baffle. The blocking structures can be supported in any convenient manner. This can include support bars coming up from the slot baffles, or support bars coming up from the ring. The blocking structure can be mounted on the vertical baffle, e.g., so that a gap exists between the blocking structure and the slot baffle. The gap can allow fluid to flow around the blocking structure and through the slot baffle.

An additional or alternate type of opening that can be present in a vertical baffle can be one or more drainage holes. As noted herein, liquid can accumulate in the volume between the structure defining the central opening and the conduit containing the baffle. The drainage holes can allow liquid in this volume to flow through the vertical baffle without having to pass through the one or more slot baffles. This can reduce the likelihood of stagflation of fluid in the volume outside of the structure defining the central opening. Any convenient number of drainage holes of any convenient size can be used, so long as the majority of the liquid still passes through the one or more slot baffles.

Within a conduit, a vertical annular baffle can be located in the conduit based on a proximity to a downstream junction. In an embodiment, the location of the baffle can be defined relative to the location of the exit from the central opening. The location can additionally or alternately be defined based on using the length of the baffle structure as a characteristic distance. Based on this, the exit from the central opening for a vertical annular baffle can be no more than about 0.5 times the length of the baffle structure from the entrance to a junction, for example no more than about 1.0 time, no more than about 1.5 times, or no more than about 2.0 times. Additionally or alternately, the exit from the central opening can be at least about 0.1 times the length of the baffle structure from the entrance to the junction, for example at least about 0.25 times, at least about 0.5 times, or at least about 1.0 times.

Figure 3:
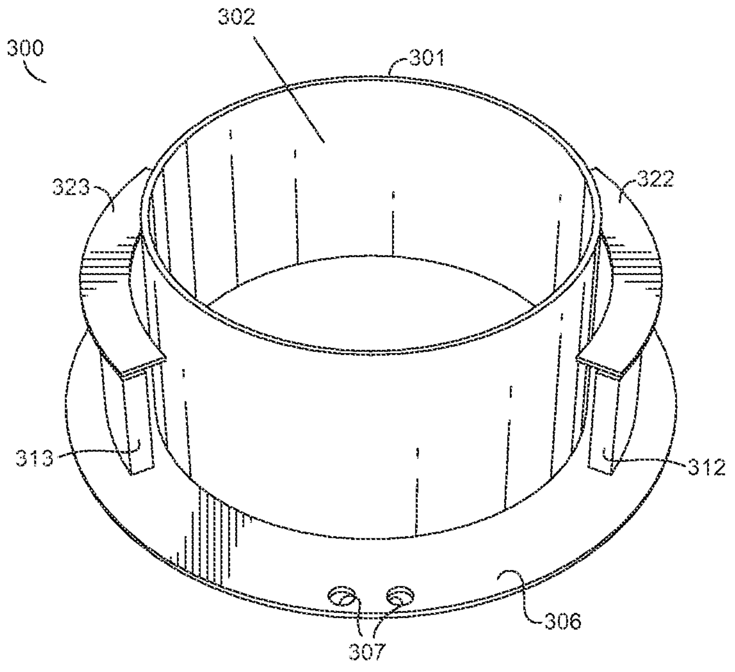
FIG. 3 schematically shows an example of a baffle suitable for use as a vertical baffle according to an embodiment of the invention.

FIG. 3 shows an example of a vertical baffle 300 according to an embodiment of the invention. In FIG. 3, a circular cylinder structure 301 defines a central opening 302. In the embodiment shown in FIG. 3, a ring 306 surrounds the circular cylinder structure 301 at the exit plane of the central opening 302. The ring can include two drainage holes 307, e.g., to reduce the likelihood of stagnation of fluid. Optionally, a symmetric set of drainage holes can be included on the other side of the ring 306. The ring can also include a pair of slot baffles 312 and 313. Slot baffles 312 and 313 can have a curved shape, e.g., that corresponds to the radius of curvature. The slot baffles 312 and 313 can be defined by a cylinder, as opposed to simply being an opening in the ring. Blocking shapes 322 and 323 can have a shape that corresponds to an enlarged version of the shape of slot baffles 312 and 313.

Figure 4:
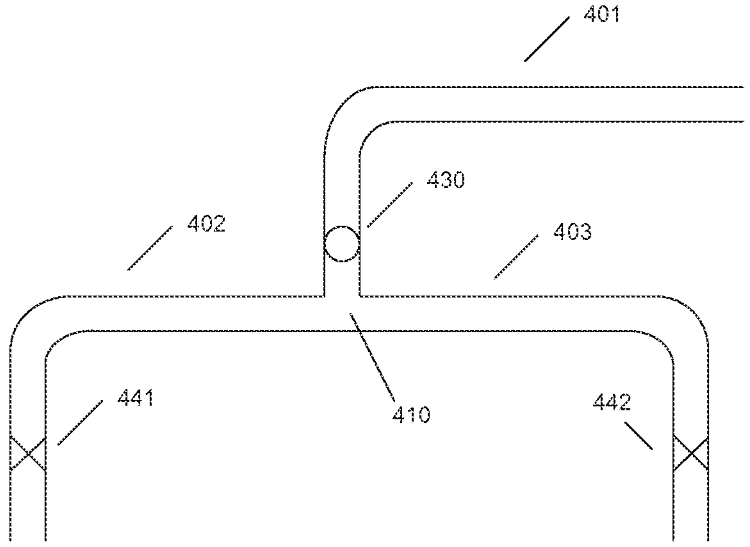
FIG. 4 schematically shows an example of a piping network that includes a vertical junction.

FIG. 4 shows a schematic example of a piping network suitable for use with a vertical baffle according to an embodiment of the invention. In FIG. 4, a fluid flow approaches a vertical tee-junction 410 via an inlet pipe 401. A vertical baffle 430 can be located in inlet pipe 401 prior to the tee-junction 410. After passing through the vertical baffle 430, fluid can enter tee-junction 410 and can be split into outlet pipes 402 and 403. In the example shown in FIG. 4, outlet pipes 402 and 403 serve as input to refinery process elements, such as fin-fan heat exchangers. Locations 441 and 442 are examples of possible locations for such refinery process elements. The use of the vertical baffle 430 can result in a more equal distribution of the gas phase portion and/or the liquid phase is portion of the input fluid flow to the refinery process elements at locations 441 and 442.

Additional Embodiments

Additionally or alternately, the invention can include one or more of the following embodiments.

Embodiment 1. A baffle structure for a conduit carrying a fluid flow including a gas phase component and a liquid phase component, comprising: a structure that defines a central opening; a ring surrounding the structure defining the central opening, an inner surface of the ring being in contact with the structure defining the central opening; a plurality of slots in the ring, each slot having a slot entrance; at least one barrier plate located a distance above an entrance for each of the plurality of slots, the at least one barrier plate providing a total barrier plate surface area that is greater than a combined area of the slot entrances; and at least one drainage hole, the drainage hole have an area less than area of a slot entrance.

Embodiment 2. The baffle structure of embodiment 1, wherein at least one slot entrance comprises a slot cylinder extending up from the surface of the ring toward the barrier plate, the slot cylinder having the shape of the slot.

Embodiment 3. The baffle structure of embodiment 1 or a) embodiment 2, wherein the ring is located at an exit plane of the structure defining the central opening.

Embodiment 4. A baffle structure for a conduit carrying a fluid flow including a gas phase component and a liquid phase component, comprising: a structure that defines a central opening; a plurality of rings surrounding the structure defining the central opening, an inner surface of at least one of the plurality of rings being in contact with the structure defining the central opening; and at least one slot in each of the rings, the slots being aligned to create a pass-through opening along an axis parallel to an axis of the central opening.

Embodiment 5. The baffle structure of embodiment 4, further comprising a straightening vane that partitions the pass-through opening, the straightening vane being aligned parallel to the axis of the cylinder defining the central opening.

Embodiment 6. The baffle structure of embodiment 4 or embodiment 5, further comprising one or more walls located adjacent to the slots and between the rings, the wall(s) defining a pass-through conduit between the rings.

Embodiment 7. The baffle structure of any of embodiments 4 to 6, wherein at least one ring is located at an exit plane of the structure defining the central opening.

Embodiment 8. The baffle structure of any one of the previous embodiments, wherein the slots have a rectangular cross-section.

Embodiment 9. The baffle structure of any one of the previous embodiments, wherein the slots have an arcuate cross-section corresponding to the radius of curvature of the ring at the location of the slot.

Embodiment 10. The baffle structure of any one of the previous embodiments, wherein the surface area of the central opening is from about 40% to about 80% of the total cross-sectional area of the baffle.

Embodiment 11. The baffle structure of any one of the previous embodiments, wherein the structure defining the central opening is a circular cylinder.

Embodiment 12. The baffle structure of any one of the previous embodiments, wherein the baffle structure is part of a conduit junction structure, the conduit junction structure comprising: an inlet conduit, the baffle structure being at a location in the inlet conduit; at least two outlet conduits; and a conduit junction providing fluid communication between the inlet conduit and the at least two outlet conduits, wherein the cross-section of the baffle structure corresponds to an interior cross-section of the inlet conduit at the location.

Embodiment 13. The baffle structure of embodiment 12, wherein the location of the baffle structure in the inlet conduit corresponds to the exit of the baffle structure being a distance from the conduit junction of no more than about 2.0 times the length of the baffle structure, for example no more than about 1.5 times the length or no more than about 1.0 times the length.

Embodiment 14. The baffle structure of embodiment 12 or embodiment 13, wherein the conduit junction is a vertical conduit junction structure or a horizontal conduit junction structure.

Embodiment 15. Use of a baffle structure according to any of embodiments 12 to 14 in a method for improving the distribution of a fluid flow between outlet conduits of a conduit junction, the method comprising: introducing a fluid flow including both a gas phase component and a liquid phase component into the inlet conduit of the conduit junction; passing the fluid flow through a baffle structure, at least a portion of the gas phase component passing through the central opening of the baffle structure and at least a portion of the liquid phase component passing through the plurality of slots in the ring; and dividing the fluid flow between the at least two outlet conduits, a volume of the gas phase component received by each outlet conduit differing by about 15% or less, for example about 10% or less, and/or a volume of the liquid phase component received by each outlet conduit differing by about 15% or less, for example about 10% or less, wherein a volume of the gas phase component and/or the liquid phase component received by each outlet conduit differs, in the absence of the baffle structure, by at least about 20%, for example at least about 25% or at least about 30%.

EXAMPLES

Vertical Baffle

The following examples include both modeling of fluid flows in a piping network using computational fluid dynamics and experimental tests on a corresponding piping configuration.

A set of simulations was performed to determine the benefit of a vertical baffle. The simulations were designed to simulate a series of pipes similar to the piping shown in FIG. 4. A similar piping configuration was also used for the physical experiments. For both the model and the physical piping configuration, the portion of the inlet pipe immediately prior to the junction was aligned with the vertical axis. The conduits were configured to form a tee-junction with a ~90° angle between the input conduit and both exit conduits. By volume, the feed for both the simulation and the experiments was about 2% liquid and about 98% gas. By mass, the feed was about 71% liquid and about 29% gas. The length to diameter ratio for the section of straight pipe leading to the tee-junction was about 3.5.

In the simulations, due to various features upstream from the section shown in FIG. 4, a swirling feed was created in the inlet conduit. In simulations without the presence of a vertical baffle, one of the output flows received about 16% of the liquid phase portion and about 60% of the gas phase portion of the input flow. The other output flow received about 84% of the liquid phase portion and about 40% of the gas phase portion. Multiple simulations were performed to allow for calculation of a standard deviation. The standard deviation for the liquid values was less than 5%, while the standard deviation for the gas values was less than 1%. These values are shown in Table 1 below.

In a second series of simulations, a vertical baffle was inserted in the inlet pipe prior to the tee-junction. The exit plane of the vertical baffle was located within one pipe diameter of the tee-junction. In the simulations with the vertical baffle, one of the output flows received about 47% of the liquid Phase portion and about 51% of the gas phase portion of the input flow. The other output flow received about 53% of the liquid phase portion and about 49% of the gas phase portion of the input flow. The standard deviation for the liquid phase split was between 10% and 15%, while the standard deviation for the gas phase split was less than 5%.

TABLE 1

| Vertical (Computational Modeling) | | |
|---|---|---|
| | Branch A | Branch B |
| Liquid | | |
| Without baffle | ~16% (~1%) | ~84% (~3%) |
| With baffle | ~47% (~13%) | ~53% (~12%) |
| Gas | | |
| Without baffle | ~60% (~0.3%) | ~40% (~0.3%) |
| With baffle | ~51% (~3%) | ~49% (~3%) |

The computational fluid dynamics simulations clearly show an improvement in the split of both the gas phase portion and liquid phase portion of the input flow in the configuration with the baffle. Both the gas phase portion and liquid phase portion are split roughly equally between the two output flows. It is noted that for the configuration without the baffle, the original liquid split was about 84/16. Using conventional methods, this type of severe disparity in liquid split can be difficult to remedy.

Experimental tests were also performed with and without a vertical baffle. Different combinations of upstream piping and/or flow velocities were to generate the input flow in order to test different conditions at the tee-junction. Table 2 shows the improvement in the liquid split from several experiments.

TABLE 2

| Vertical (Experimental, Liquid only) | | | | |
|---|---|---|---|---|
| | Without Baffle | | With Baffle | |
| Liquid | Branch A | Branch B | Branch A | Branch B |
| Run A | ~66% | ~34% | ~43% | ~57% |
| Run B | ~71% | ~29% | ~46% | ~54% |
| Run C | ~62% | ~38% | ~56% | ~44% |

In Table 2, the improvement in the liquid splits between the two branches of the tee-junction appears to confirm the improvement in flow split predicted by the computational modeling. In the experimental runs without the vertical baffle, the split between the exit branches differed by at least about 24% (from about 24% to about 42%). With a vertical baffle, the split between the exit branches was reduced to less than about 15% (from about 8% to about 14%).

EXAMPLES

Horizontal Baffle

The following examples include both modeling of fluid flows in a piping network using computational fluid dynamics and experimental work on a corresponding piping configuration.

A set of simulations were performed to investigate the performance of a horizontal baffle. The simulations were performed on a configuration similar to the configuration shown in FIG. 2. A similar piping configuration was also used for the physical experiments. For both the model and the physical piping configuration, the portion of the inlet pipe immediately prior to the junction was aligned with the horizontal plane. The conduits were configured to form a tee-junction with a ~90° angle between the input conduit and both exit conduits. By volume, the feed for both the simulation and the experiments was about 2% liquid and about 98% gas. By mass, the feed was about 71% liquid about 29% gas. The length to diameter ratio for the section of straight pipe leading to the tee-junction was about 4.5.

In the simulations, due to various features upstream from the section shown in FIG. 2, a swirling feed was created in the inlet conduit. In simulations without the presence of a horizontal baffle, one of the output flows received about 32% of the liquid phase portion and about 56% of the gas phase portion of the input flow. The other output flow received about 68% of the liquid phase portion and about 44% of the gas phase portion. Multiple simulations were performed to allow for calculation of a standard deviation. The standard deviation for the liquid values was less than 2%, while the standard deviation for the gas values was less than 1%. These values are shown in Table 3 below.

In a second series of simulations, a horizontal baffle was inserted in the inlet pipe prior to the tee-junction. The exit plane of the horizontal baffle was located within one pipe diameter of the tee-junction. In the simulations with the horizontal baffle, one of the output flows received about 43% of the liquid phase portion and about 52% of the gas phase portion of the input flow. The other output flow received about 57% of the liquid phase portion and about 48% of the gas phase portion of the input flow. The standard deviation for both the liquid phase split and gas phase split was 1% or less.

TABLE 3

| Horizontal (Computational Modeling) | | |
|---|---|---|
| | Branch A | Branch B |
| Liquid | | |
| Without baffle | ~32% (~1.1%) | ~68% (~1.3%) |
| With baffle | ~43% (~1.0%) | ~57% (~0.4%) |
| Gas | | |
| Without baffle | ~56% (~0.2%) | ~44% (~0.2%) |
| With baffle | ~52% (~0.1%) | ~48% (~0.1%) |

As shown in Table 3, the horizontal baffle improved the split of fluid for both the gas phase portion and the liquid phase portion of the input flow.

Experimental tests were also performed with and without a vertical baffle. Different combinations of upstream piping and/or flow velocities were to generate the input flow in order to test different conditions at the tee-junction. Table 4 shows the improvement in the liquid split from several experiments.

TABLE 4

| Horizontal (Experimental, Liquid only) | | | | |
|---|---|---|---|---|
| | Without Baffle | | With Baffle | |
| Liquid | Branch A | Branch B | Branch A | Branch B |
| Run A | ~12% | ~88% | ~43% | ~57% |
| Run B | ~20% | ~80% | ~55% | ~45% |
| Run C | ~59% | ~41% | ~53% | ~47% |

In Table 4, the improvement in the liquid splits between the two branches of the tee-junction appears to confirm the improvement in flow split predicted by the computational modeling. Runs A and B resulted in a severe disparity in liquid split of at least about 60% (from about 60% to about 76%) when a baffle was not used. With the horizontal baffle, the difference in the liquid split between the exit branches was reduced to no more than about 15% (from about 10% to about 14%). The horizontal baffle also showed improvement for Run C. The initial ~18% split between the exit conduits without a baffle was reduced to no more than about 15% (also no more than about 10%; actually about 6%).

Overall, the analysis of the liquid split from the experimental tests of both the vertical baffle and horizontal baffle confirms the predicted benefits of using the baffles. For both the horizontal and vertical baffles, the flow distribution between exit branches of a tee-junction (or other type of split junction) is improved by insertion of the baffle prior to the junction.

What is claimed is:

1. A baffle structure for a conduit carrying a fluid flow including a gas phase component and a liquid phase component, the baffle structure comprising:
- a structure that defines a central opening;
- a ring surrounding the structure defining the central opening, an inner surface of the ring being in contact with the structure defining the central opening;
- a plurality of slots in the ring, each slot having a slot entrance;
- at least one barrier plate located a distance above an entrance for each of the plurality of slots, the at least one barrier plate providing a total barrier plate surface area that is greater than a combined area of the slot entrances; and
- at least one drainage hole, the drainage hole have an area less than an area of a slot entrance.

2. The baffle structure of claim 1, wherein at least one slot entrance comprises a slot cylinder extending up from the surface of the ring toward the barrier plate, the slot cylinder having the shape of the slot.

3. The baffle structure of claim 1, wherein the slots have a rectangular cross-section.

4. The baffle structure of claim 1, wherein the slots have an arcuate cross-section corresponding to the radius of curvature of the ring at the location of the slot.

5. The baffle structure of claim 1, wherein the structure defining the central opening is a circular cylinder, the surface area of the central opening being from about 40% to about 80% of the total cross-sectional area of the baffle.

6. The baffle structure of claim 1, wherein the ring is located at an exit plane of the structure defining the central opening.

7. The baffle structure of claim 1, wherein the baffle structure is part of a conduit junction structure, the conduit junction structure comprising:
- an inlet conduit, the baffle structure being at a location in the inlet conduit;
- at least two outlet conduits; and
- a conduit junction providing fluid communication between the inlet conduit and the at least two outlet conduits,
- wherein the cross-section of the baffle structure corresponds to an interior cross-section of the inlet conduit at the location.

8. The baffle structure of claim 7, wherein at least one outlet conduit has an interior that does not contain a flow modification device.

9. The baffle structure of claim 7, wherein the conduit junction is a vertical conduit junction structure.

10. The baffle structure of claim 8, wherein the location of the baffle structure in the inlet conduit corresponds to the exit of the baffle structure being a distance from the conduit junction of about 1.0 times the length of the baffle structure.

11. A method for improving the distribution of a fluid flow between outlet conduits of a conduit junction, comprising:
- introducing a fluid flow including both a gas phase component and a liquid phase component into an inlet conduit of a conduit junction, the conduit junction having at least two outlet conduits;
- providing a baffle structure in the inlet conduit, the baffle structure comprising
  - a structure that defines a central opening;
  - a ring surrounding the structure defining the central opening, an inner surface of the ring being in contact with the structure defining the central opening;
  - a plurality of slots in the ring, each slot having a slot entrance;
  - at least one barrier plate located a distance above an entrance for each of the plurality of slots, the at least one barrier plate providing a total barrier plate surface area that is greater than a combined area of the slot entrances; and
  - at least one drainage hole, the drainage hole have an area less than an area of a slot entrance;
  - wherein an exit from a central opening of the baffle structure is no more than about 2.0 times the length of the baffle structure from the conduit junction;
- passing the fluid flow through the baffle structure, at least a portion of the gas phase component passing through the central opening of the baffle structure and at least a portion of the liquid phase component passing through the plurality of slots in the ring; and
- dividing the fluid flow between the at least two outlet conduits, a volume of the gas phase component received by each outlet conduit differing by about 15% or less, and a volume of the liquid phase component received by each outlet conduit differing by about 15% or less,
- wherein a volume of the gas phase component and/or the liquid phase component received by each outlet conduit differs by at least about 20 % in the absence of the baffle structure.

12. The method of claim 11, wherein the fluid flow comprises an annular fluid flow or a stratified fluid flow.

13. The method of claim 11, wherein the conduit junction is a vertical conduit junction structure.

14. The method of claim 11, wherein the volume of the liquid phase component of the divided fluid flow received by each outlet conduit differs by about 10% or less.

* * * * *